United States Patent [19]

Dunsford

[11] Patent Number: 5,177,894
[45] Date of Patent: Jan. 12, 1993

[54] OUTRIGGER RELEASE

[76] Inventor: Ralph Dunsford, R.F.D. 3, Box 72, Belfast, Me. 04915

[21] Appl. No.: 864,774

[22] Filed: Apr. 7, 1992

[51] Int. Cl.⁵ .................................................. A01K 97/00
[52] U.S. Cl. .................................. 43/43.12; 43/17.2; 24/303
[58] Field of Search .............. 43/43.12, 27.4, 17.2; 403/92, DIG. 1, DIG. 3; 24/303, 133, 94, 49 M, 132 WL

[56] References Cited

U.S. PATENT DOCUMENTS

| | | | |
|---|---|---|---|
| 2,170,594 | 8/1939 | Nicholson | 43/43.12 |
| 2,730,832 | 1/1953 | Mathers | 43/43.11 |
| 2,749,648 | 6/1956 | Schneider | 43/43.12 |
| 3,012,353 | 12/1959 | Leech | 43/43.12 |
| 3,037,317 | 6/1962 | Morrison | 43/43.12 |
| 3,077,048 | 10/1964 | Strumpf | 43/43.12 |
| 3,136,086 | 6/1964 | Morrison | 43/43.12 |
| 3,629,966 | 12/1971 | Sanchez | 43/43.11 |
| 3,710,501 | 1/1973 | Ware | 43/43.11 |
| 3,883,981 | 5/1975 | Bohn | 43/43.12 |
| 3,892,083 | 7/1975 | Peterson | 43/43.12 |
| 3,919,563 | 11/1975 | Lautier | 307/119 |
| 4,065,869 | 1/1978 | Berry | 43/43.12 |
| 4,527,311 | 7/1985 | Aoki | 24/303 |
| 4,635,391 | 1/1987 | Early | 43/43.12 |
| 4,700,505 | 10/1987 | Weber | 43/43.12 |
| 4,890,854 | 1/1990 | Hoover | 24/303 |

Primary Examiner—Richard K. Seidel
Assistant Examiner—Jeanne M. Elpel
Attorney, Agent, or Firm—David H. Semmes

[57] ABSTRACT

Outrigger release for trolling lines used in fishing for bill fish which stun their prey. The adjustable release is characterized by a pivoted arm which has a tip end releasably engaging a fishing line ring and an elongated shank engaging a magnet supported within the housing. Modification in position or size of the magnet thus adjusts the amount of tension required to pivot the arm and release the fishing line ring.

12 Claims, 3 Drawing Sheets

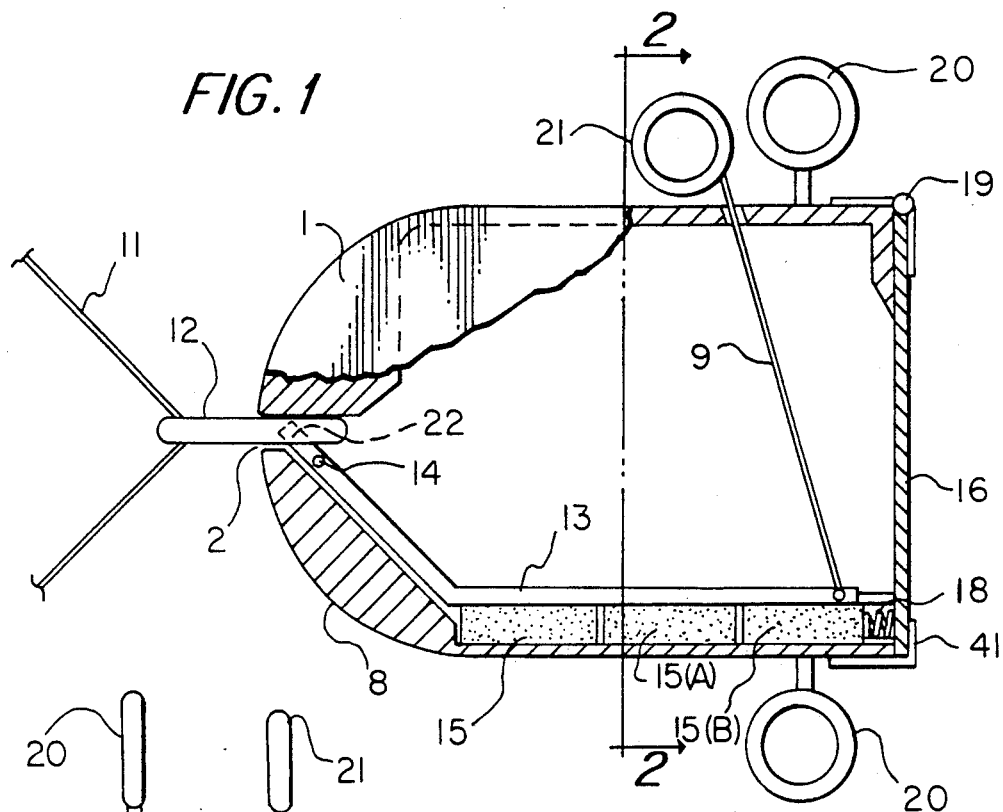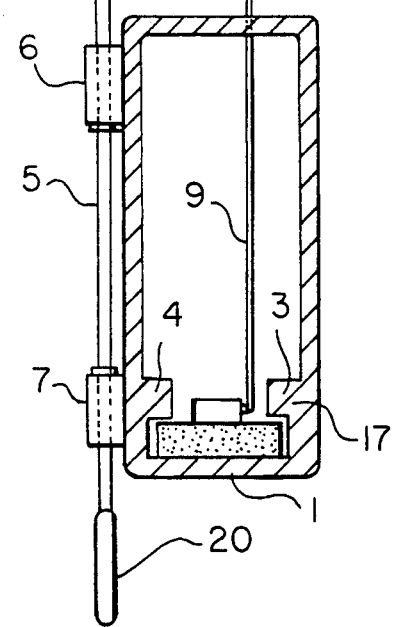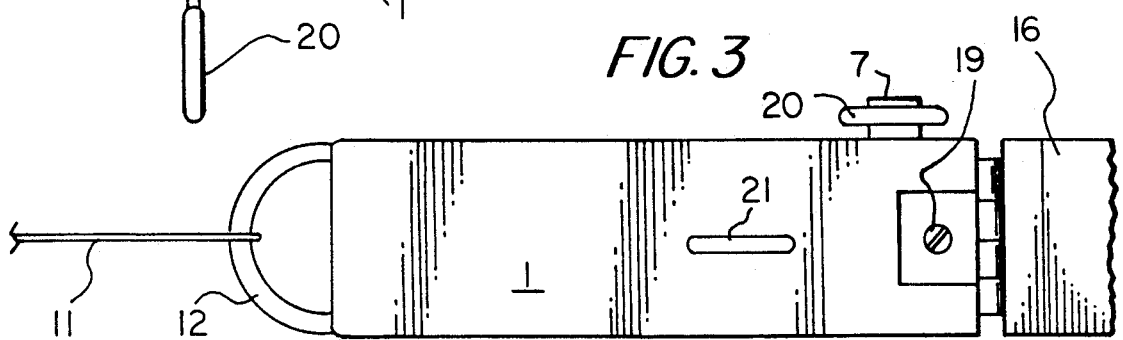

OUTRIGGER RELEASE

BACKGROUND OF THE INVENTION

1. Field of the Invention

Fishing, particularly an outrigger release for engaging a fishing line.

2. Description of the Prior Art

| | |
|---|---|
| P. C. NICHOLSON | 2,170,594 |
| J. SCHNEIDER | 2,749,648 |
| J. I. MORRISON | 3,037,317 |
| D. SANCHEZ | 3,629,966 |
| RICHARD S. WARE, JR. | 3,710,501 |
| CARMEN A. PETERSON | 3,892,083 |
| AUGUST C. BOHN | 3,883,981 |
| LAUTIER | 3,919,563 |

SUMMARY OF THE INVENTION

Outrigger releases are employed as an aid in trolling for those bill fish, such as Marlin, Sailfish and Tuna which may stun their prey prior to engorgement. The fishing line is extended from the fishing pole to an outrigger attachment which releases the fishing line, as the fish strikes the trolling bait. This release enables the trolling bait to be suspended immovably, thus feigning stunning or disablement to the prey.

Traditionally, a clothespin-type device has been employed as the outrigger release and more recently radio controlled release solenoids have been employed. The shortcoming of both the clothespin and radio-controlled release is that the force of release cannot be adjusted.

According to the present invention, the force of release may be readily adjusted. Also, the release may be manually operated, or operated by radio remote control, as the boat captain sights the prey.

DESCRIPTION OF THE DRAWINGS

FIG. 1 is a side elevation partially in vertical section, of the outrigger release housing showing the engagement of the fishing line ring by means of a pivoted lever arm.

FIG. 2 is a transverse section, showing a magnet seated in the bottom of the housing.

FIG. 3 is a fragmentary top plan, with the housing access door pivoted open.

DESCRIPTION OF THE PREFERRED EMBODIMENTS

Figure 4:
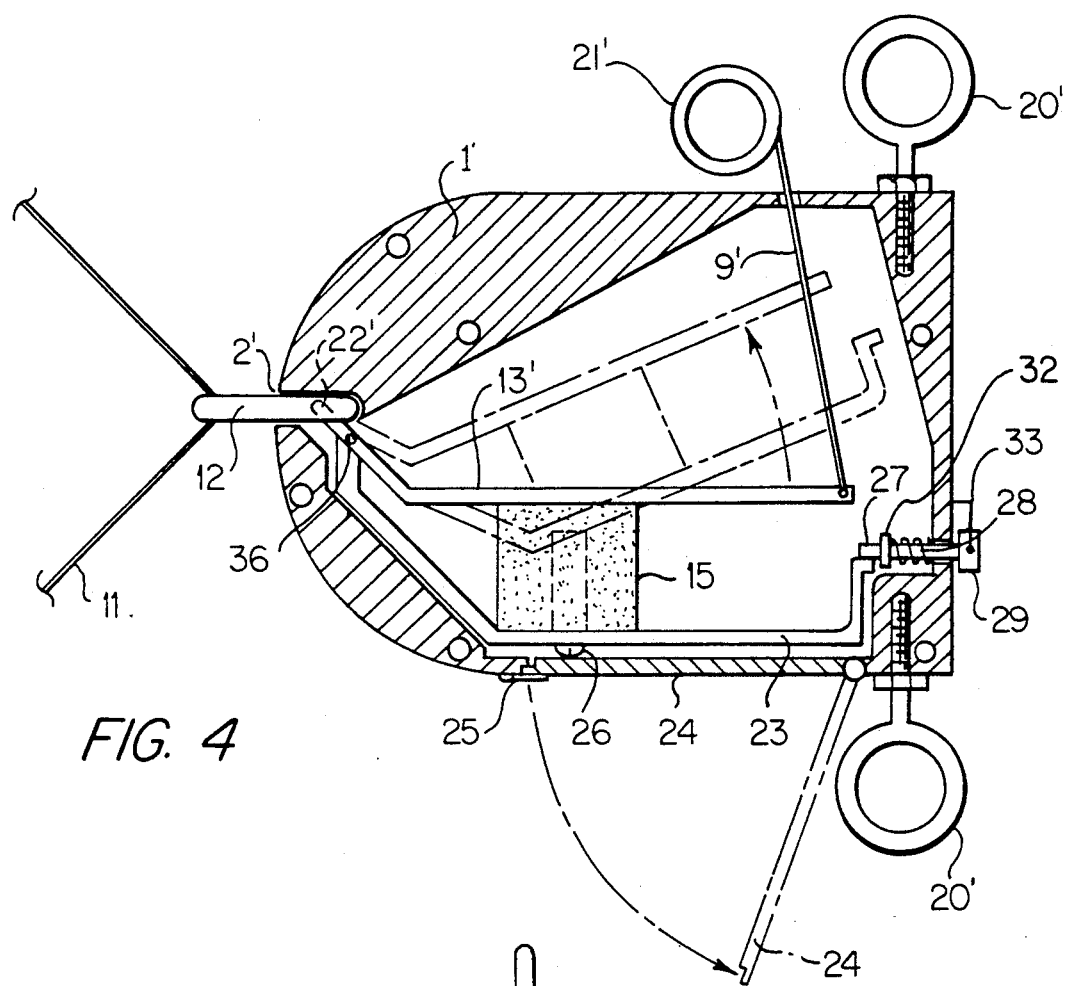
FIG. 4 is a vertical section of a modified housing having a radio remote controlled release mechanism, together with upper lever arm and lower support arm, pivoted within the housing.

In FIG. 1, there is illustrated fishing line 11 extending through fishing line ring 12 which is adjustably positioned within housing 1 by means of horizontal seat 2.

As illustrated in FIG. 2, housing 1 includes lower inner shoulders 3, 4 extending above magnets 15, 15(A), 15(B) seated within the bottom of the housing. A pair of halyard rings 20 may be supported exteriorly of housing 1 upon a vertical shaft 5 fitted within bosses 6 and 7, such that the housing may be secured upon a halyard or like fitting (not illustrated).

Lever arm 13 having a tip end 22 releasably engaging fishing line ring 12 and an elongated shank 13 resting upon magnets 15, 15(A) and 15(B) is pivoted within housing 1 as at 14. A manually operable release line 9 may extend from the elongated shank of lever arm 13 to release ring 21 positioned upon the top of the housing 1. Compression spring 18 may be interposed as a magnet fitting between housing access door 16 and magnet 15(B). Manifestly, access door 16 may be fitted upon conventional hinge 19 secured to the exterior of housing 1 and include a lock or catch 41.

As will be apparent, fishing line ring 12 which may be made of plastic is held in position by tip end 22. Lever arm 13 may be manufactured of coated steel, such that it is held in position by magnets 15, 15(A) and 15(B).

If a fish strikes the lure or bait with sufficient force, lever action arm 13 will pivot as at 14, overcoming the attraction of magnets 15, 15(A) and 15(B), such that the pivot of tip 22 will allow ring 12 and fishing line 11 to be released.

The force required to effect this release can be adjusted in two ways:

1. Magnet 15 selection: Several different pull strength magnets are available and may be easily changed as desired.
2. Adjustment of effective lever arm 13 length: The magnet(s) chosen can be moved along the shank of lever arm 13 and secured as desired to give the desired release pull.

Figure 5:
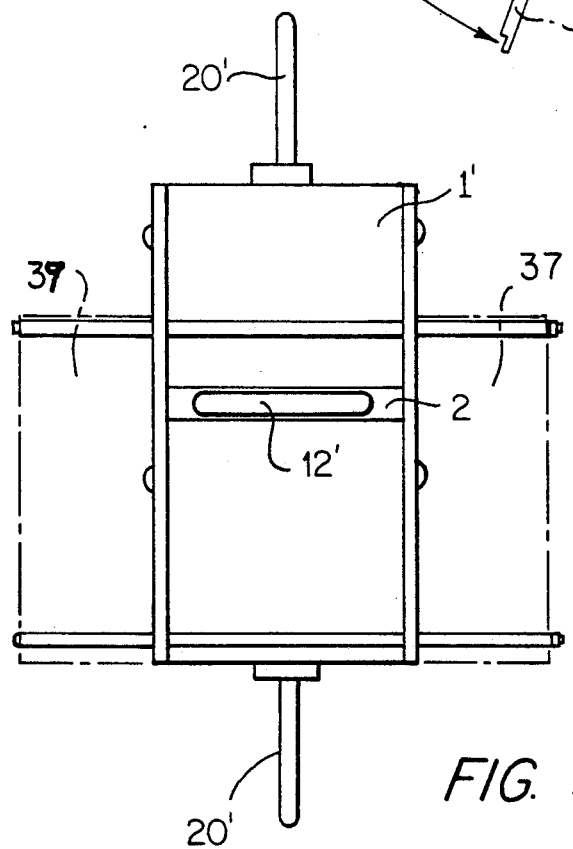
FIG. 5 is a front elevation of the modified housing.
Figure 6:
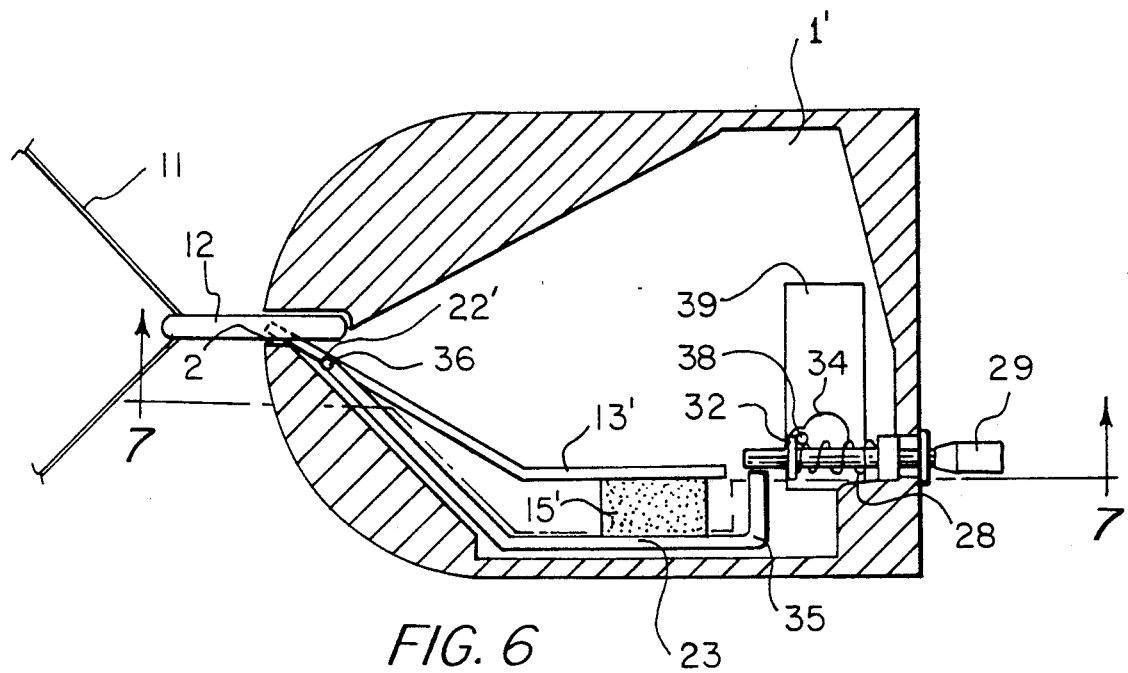
FIG. 6 is a vertical section of the modified housing with near side removed, showing a detent and radio controlled activator trigger pin.
Figure 7:
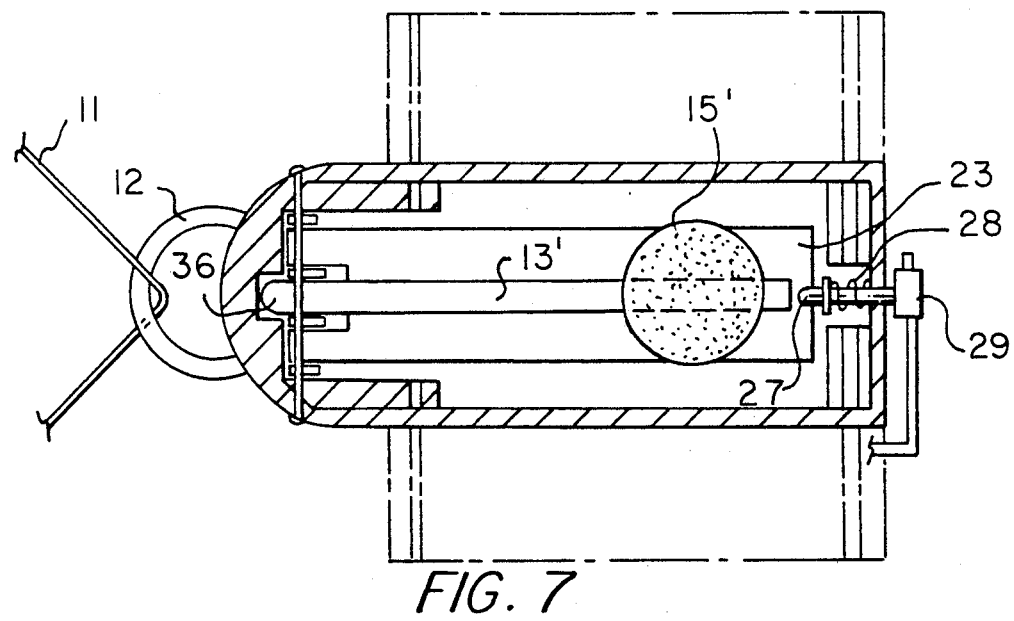
FIG. 7 is a transverse section through the lower portion of the modified housing.

In FIGS. 4, 5 and 6, a radio remote control release is illustrated as including modified housing 1', fishing line ring seat 2', and fishing line ring 12 removably seated therein by upper lever arm 13', tip end 22'. Upper lever arm 13' may be pivoted as at 36 coaxially with lower support arm 23. One or more adjustable magnets 15' may be supported upon lower support arm 23 by means of set screws 26 or the like, so as to vary the tension required for release. A lower access door 24 may be pivoted to the lower part of the housing and secured by conventional clasp 25. Also, a pair of halyard loops 20' in the form of eye screws may be secured within the top of the housing 1' and a manual release line 9' and 21' ring provided.

As will be apparent, detent 27 including flange 32 and compression spring 28, may be mounted within the housing so as to engage the vertically extending tip 35 of lower support arm 23. The device may be released manually by rod 33 extending to outer boss 29.

Alternatively, as illustrated in FIG. 6, a radio control servo mechanism 39 may include rotating wheel 34 with trigger pin 38 which engages flange 32 and thereby releases lower support arm tip 35 for pivoting and release of the fishing line 11'.

In FIG. 5 there are illustrated in phantom optical side compartments 37, 38 for the radio receiver, batteries, and like components.

The configuration of control magnet 15' provides for varying pivoting or release; by moving magnet 15' along lower support arm 23.

In the illustration in FIG. 1, theoretic examples of magnet specifications may be as follows:

Magnet "X":
 Pull: 6 pounds;
 Release: 24 to 28 pounds;
 Diameter: 0.688;

Height: 0.625
Magnet "Y":
Pull: 10 pounds;
Release: 40 to 80 pounds;
Diameter: 0.813;
Height: 0.750

Note: if less than the basic 6 pound pull magnets are desired, button magnets may be selected, but will require a different size bolt and nut of non-magnetic material.

In the radio remote control modification illustrated in FIG. 6, push rod 29 is pushed approximately ⅜ inch upon receipt of a radio signal inducing motion of trigger pin 33 upon rotating wheel 34. Trigger pin 33 holds lower support arm 23 to which holding magnet 15' is attached. As push rod 29 is retracted, upper arm 13' and lower arm 23 are released to rotate about pivot pin 36. During this rotation or pivoting upper lever arm 13' permits "Nylon" fishing line ring 12 and fishing line 11 to escape.

Fish Strike Control Release (FIG. 1)

Fishing line ring 12 is engaged in seat 2 with a length of monofilament fishing line 11 (40 pound) extending therethrough.

The device should be held or suspended by means of halyard rings 20 and a constant weight applied on monofilament 11. A teaser or plug may be employed together with a slight manual pulling to test for strength of pull.

To stimulate a normal fish strike release, a sudden heavier pull is applied to the teaser lure or bait such that a normal quick release results.

To Reset the Device (FIG. 4)

1) turn housing 1 upside down;
2) gently but firmly pull reset knob 29 about one-half inch;
3) still upside down, insert ring 12 all the way into slot 2;
4) hold ring 12 in slot 2' and rotate housing 1 to right side up, while releasing knob 29. A test pull on ring 12 shows that a ring 12 is hooked or held within the device.

Testing Radio Remote Control Release

1) Supply constant light, but firm pull on mono line 11 or teaser, to simulate trolling;
2) Extend transmitter antenna;
3) Turn on transmitter power switch;
4) Maintain some reasonable distance between the transmitter and the device;
5) Turn on power switch (not illustrated) in housing 1;
6) When release is desired, activate transmitter to rotate wheel 34, releasing tip end 35 for pivoting and disengagement of ring 12.

Manifestly, the device may be held in the hand or anchored by halyard rings and various modifications may be made without departing from the scope of the claims.

I claim:
1. Outrigger release for a fishing line, comprising:
a) a housing defining an inner chamber opening into a horizontal seat for a fishing line ring;
b) a fishing line ring removably supported upon said horizontal seat;
c) at least one magnet movably supported within said inner chamber, and
d) a lever arm having a tip end and an elongated shank, said lever arm being pivoted within said inner chamber such that said tip end protrudes into said horizontal seat and engages said fishing line ring, while said elongated shank rests upon said magnet as an adjustable restraint.

2. Outrigger release for a fishing line, comprising:
a) a housing defining an inner chamber opening into a horizontal seat for a fishing line ring;
b) a fishing line ring removably supported upon a horizontal seat;
c) at least one magnet movably supported within said inner chamber;
d) a lever arm having a tip end and an elongated shank, said lever arm being pivoted within said chamber such that said tip end protrudes into said horizontal seat and engages said fishing line ring while said elongated shank rests releasably upon said magnet as an adjustable restraint; and
e) a release line leading from said elongated shank through the exterior of said housing.

3. An outrigger release for a fishing line as in claim 2, in combination with a fishing line extensible through said fishing line ring.

4. An outrigger release for fishing lines as in claim 2, including a plurality of magnets adjustably supported within said housing in juxtaposition with said elongated shank.

5. An outrigger release for fishing lines as in claim 4, including resilient means interposed between said magnets and a surface of said inner chamber.

6. An outrigger release for fishing lines as in claim 5, including an access door pivoted in said housing, so as to afford access to said inner chamber.

7. An outrigger release for fishing lines as in claim 6, including at least one halyard ring supported exteriorly of said housing.

8. An outrigger release for fishing lines as in claim 7, further including a radio activated trigger pin supported upon a rotating wheel mounted within said inner chamber such that said trigger pin engages said detent and thereby releases said lower support arm upon radio activation.

9. An outrigger release for fishing lines as in claim 8, including an access door pivoted in a lower part of said housing.

10. An outrigger release for fishing lines as in claim 2, said magnet being adjustably supported below said lever arm shank so as to vary the strength of pull required to release said fishing line ring from said lever arm tip end.

11. An outrigger release for fishing lines, comprising:
a) a housing defining an inner chamber opening into a horizontal seat for a fishing line ring;
b) a fishing line ring removably supported upon said horizontal seat;
c) an upper lever arm having a tip end and an elongated shank, said upper lever arm being pivoted within said inner chamber such that said tip end protrudes into said horizontal seat and engages the fishing line ring;
d) a lower support arm coaxially secured at a tip end with said upper lever arm and including an elongated shank supported at the bottom of said inner chamber; and
e) at least one magnet movably supported upon said lower support arm, so as to engage said elongated shank of said upper lever arm as an adjustable restraint.

12. An outrigger release for fishing lines as in claim 11, further including a detent extensible through said housing so as to engage said elongated shank of said lower support arm.

* * * * *